Dec. 15, 1964 H. V. KINDSETH ETAL 3,161,705
METHOD OF MAKING MOLDING FORMS
Original Filed Feb. 6, 1958 3 Sheets-Sheet 1

INVENTORS
HAROLD V. KINDSETH
JOHN A. JOHNSON
THOMAS B. LUDLOW
By Moore, White & Burd
ATTORNEYS Dec. 15, 1964     H. V. KINDSETH ETAL     3,161,705
METHOD OF MAKING MOLDING FORMS
Original Filed Feb. 6, 1958     3 Sheets-Sheet 3

INVENTORS
HAROLD V. KINDSETH
JOHN A. JOHNSON
THOMAS B. LUDLOW
By Moore, White & Burd
ATTORNEYS

United States Patent Office 3,161,705
Patented Dec. 15, 1964

3,161,705
METHOD OF MAKING MOLDING FORMS
Harold V. Kindseth and John A. Johnson, Minneapolis, and Thomas B. Ludlow, St. Paul, Minn., assignors to Bemis Bro. Bag Company, Minneapolis, Minn., a corporation of Missouri
Original application Feb. 6, 1958, Ser. No. 713,762, now Patent No. 3,001,582, dated Sept. 26, 1961. Divided and this application Oct. 6, 1958, Ser. No. 765,573
7 Claims. (Cl. 264—92)

This invention relates to molding forms. More particularly it relates to a new and improved method of making shaped perforated molds of the type in which a pressure differential across the surface of said mold causes the deposition of fibrous material on the surface thereof.

Molding forms made in accordance with this invention are suitable for compacting fibrous material of all types, such as felt or fibrous paper pulp. Molding forms made according to this invention are especially suitable for the molding of fibrous pulp suspended in a slurry.

A method widely used in constructing molds for shaping wet pulp consists of wrapping a metal screen over the surface of a metal form which has the shape of the article to be molded, the metal form being provided with holes in its surface which communicate with a cavity in the back of the mold. The cavity in turn is connected to a source of vacuum. When the mold is in use, the vacuum draws fibers in the region of the mold against the screen.

The manufacture of prior molds is a time-consuming and painstaking operation requiring the drilling and countersinking of a large number of holes in the metal backing, which is usually a precision casting. These forms are often fabricated in sections which must be fastened together by bolts. The screen itself must be wrapped around the various portions of the backing and clamped in position. The process is limited by the extent to which the screen can be shaped or bent around the form. Bending the screen around some intricate surfaces is difficult, if not impossible. Furthermore, these metal screens deteriorate with use in a relatively short time and frequently rescreening of the molds is required. Parting lines between mold sections often occur in a direction crosswise to the direction in which molded fibrous articles are to be removed. This causes the articles to stick on the mold, sometimes resulting in torn and useless items. More serious yet, if molded articles release poorly, stresses are set up in the items which, although not apparent when first removed from the mold, show up in the form of exaggerated warpage in the subsequent drying operation. This results in total loss of the material in the spoiled item, since the article, once dried, cannot economically be repulped.

Because the prior art backing members are relatively expensive and difficult to construct, they are oftentimes stored as a matter of economic necessity for long periods of time. The backing members made according to this invention are relatively cheap, easily constructed and may be considered disposable. At a later time if it is desired to reuse the particular screen, it is a simple one-step operation to reform the backing material. Sets of the perforated molding sheets made according to this invention may be nested together into a relatively small compact light bundle, thus greatly simplifying the storage problem.

A mold can be constructed by bonding together small spherical particles like sand grains, glass beads, resinous beads or metal shot in such a manner that a relative porous composition is formed. This improved mold greatly simplified mold construction but, because it is possible for the fibrous material to plug the interstices or holes of these molds, the proper size and shape of the beads and the amount of bonding material used is critical. Changes in the composition of the slurry may be sufficient to cause the form to eventually become plugged with fibrous material.

These difficulties in the prior art are overcome by the molding form of this invention comprising a perforated thermoplastic sheet formed to the desired shape of the article to be molded and optionally supported by a relatively strong rigid backing member.

It is a primary object of this invention to provide a new and improved method of making a mold for compacting fibrous material, which method requires no casting, drilling, threading and fitting of metal parts in the fabrication of the mold.

It is another object of this invention to provide a method for making a mold for compacting fibrous material from a slurry to a predetermined shape, which mold is inherently resistant to acids, alkalies and other corrosive agents likely to be found in said slurry.

It is a further object of this invention to provide a method for making a mold for compacting fibrous material to a predetermined shape including forming a perforated thermoplastic sheet into desired shape while in a heat softened condition.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which.

Figure 1:
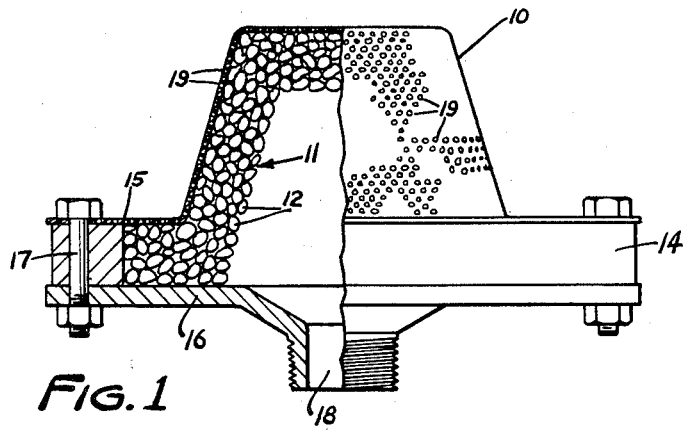
FIGURE 1 is an elevation, partly in section, of one embodiment of the mold made according to this invention.
Figure 2:
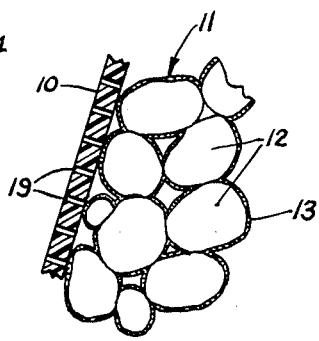
FIGURE 2 is an enlarged fragmentary section through the embodiment of the mold illustrated in FIGURE 1.

Referring to the drawings, FIGURE 1 illustrates a molding form made according to this invention wherein the molding surface comprises a formed finely perforated thermoplastic sheet 10 which is strengthened by a backing member 11. The backing member is composed of a large number of bodies 12 of granular material of relatively uniform size bonded together by a coating of resinous material 13 applied substantially uniformly over the granules. The backing member 11 is enclosed within a frame member or ring 14. The thermoplastic sheet 10 is provided with a flange 15 by which it too is secured to the frame member 14 which in turn is secured to a support 16, as by bolts 17. The support 16 has in it a duct 18 to which a vacuum is applied. The entire molding form with its supporting means is movably mounted so that it may be immersed in a pulp slurry. The vacuum provides a pressure differential across the surface of the mold through perforations 19 which causes the fibrous material of the slurry to accumulate upon the surface of the sheet 10. Sheet 10, of course, is formed in a shape corresponding to the desired shape of the pulp molded product. Liquid from the slurry flows readily through the interstices between the granules of the backing.

As the fibrous material accumulates on the surface of the screen, the water passes through the perforations in the sheet 10 and porous backing member 11 and is exhausted through the duct 18. After the pulp article is molded, the molding form is removed from the slurry and the vacuum is continued in order to remove excess water and to compact the fibers into a relatively dense self-supporting structure. Positive air pressure sufficient to lift the fibrous mass from the surface of the screen may then be applied through the duct 18 and the molded article is removed.

Figure 3:
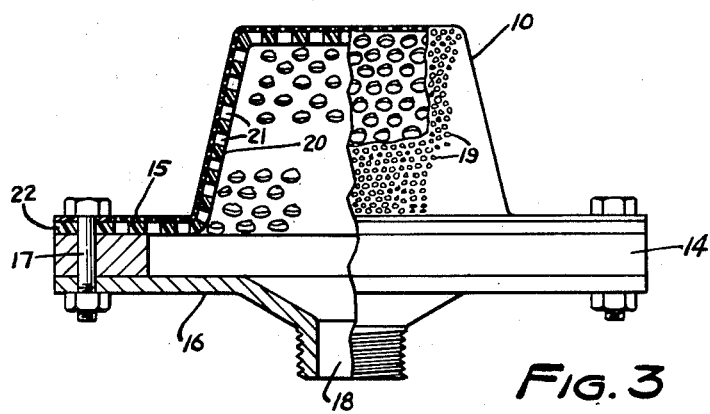
FIGURE 3 is a side elevation, partly in section, of another embodiment of a mold made according to this invention.

FIGURE 3 illustrates another embodiment of mold formed according to this invention in which the perforated thermoplastic sheet 10 is supported by means of a somewhat thicker and stronger perforated backing sheet 20 conforming in shape to molding sheet 10 and having relatively large holes 21 therein. The backing sheet 20 may be made of formable thermoplastic resinous material and may be formed by the same methods as the molding sheet 10, as hereinafter described. The backing sheet 20 may be conveniently formed simultaneously with the sheet 10, but when this is done a separator sheet or the like should be provided to insure that fusing of the two sheets does not occur. The holes 21 may be of any convenient size. One-quarter inch holes on half-inch centers were found to be satisfactory. The backing sheet 20 may be on the order of about one-eighth of an inch thick. The thickness, of course, need only be enough to produce the requisite strength. The backing sheet 20 is provided with a flange 22 by which it is affixed to the frame 14 and support 16.

Figure 4:
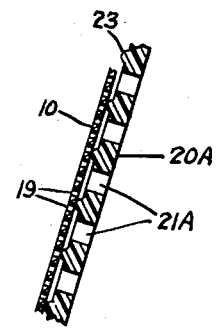
FIGURE 4 is an enlarged fragmentary section showing a preferred form of construction of the molds of FIGURES 3 and 6.

In FIGURE 4 there is illustrated a preferred optional form of construction of the backing sheet for a molding form sheet of the type illustrated in FIGURE 3. According to this preferred form of construction, the thicker perforated backing sheet 20A underlying the perforated forming sheet 10 is provided on its outer surface adjacent to the inner surface of the sheet 10 with a plurality of projections 23 or similar irregularities so that the forming or molding sheet 10 is held slightly spaced away from the regions in the backing sheet between the perforations 21A. In this manner, somewhat better and more uniform distribution of suction over the entire surface of the sheet 10 is provided and as a result, there is a lesser tendency for the sheet 10 to become clogged with pulp fibers. Substantially the same result may be achieved by roughening the surface of the backing, or scoring, knurling or the like.

Figure 5:
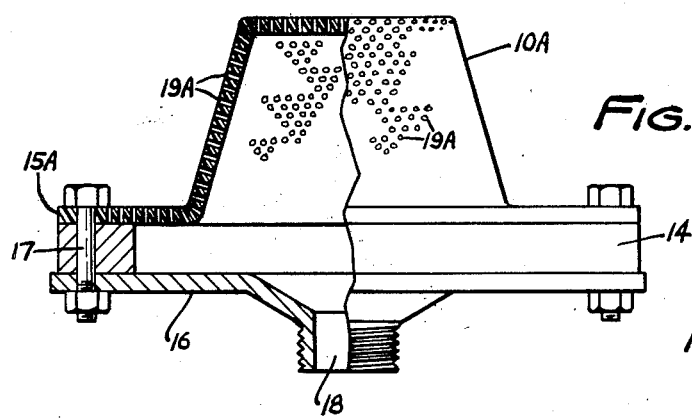
FIGURE 5 is a side elevation, partly in section, of still another embodiment of mold made according to this invention.

FIGURE 5 illustrates still another embodiment of mold formed according to this invention. In this embodiment the molding sheet 10A is thick enough so that no backing member is necessary to provide the requisite strength. By way of example, the sheet 10A may be on the order of one-eighth to three-sixteenths inch thick while the holes 19A may be on the order of 0.02 inch in diameter with about 700 holes per square inch. In this embodiment the sheet 10A may be thinner for molding relatively small articles and thicker for molding relatively large articles. The sheet 10A may likewise be formed by any of the methods outlined hereinafter. It is provided with a flange 15A by which it is affixed to frame 14 and support 16.

Figure 6:
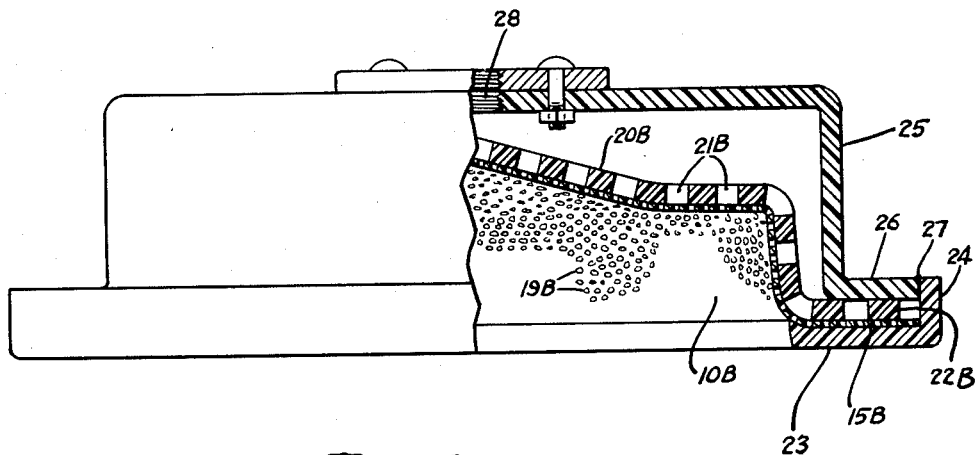
FIGURE 6 is a side elevation, partly in section, of a still further embodiment of mold made according to this invention.

In FIGURE 6 there is shown a still further modified form of molding form made according to this invention. In this modification, the molding form is a cavity mold in contrast to the plug molds previously described. Although the molding surface in this form of mold is constructed similar to the embodiment illustrated in FIGURE 3, the forms of the embodiments of FIGURES 1 and 4 may likewise obviously be employed instead. The thermoplastic perforated sheet 10B which forms the molding surface is provided with a plurality of small perforations 19B. The sheet 10B is backed by a somewhat thicker perforated thermoplastic sheet 20B having somewhat larger and more widely spaced perforations 21B. The sheets are provided with supporting flanges 15B and 22B, respectively.

The cavity mold is enclosed in a trim ring 23 having a central opening corresponding generally to that of the cavity mold and having a surrounding upturned outer flange 24. The flanges of the perforated mold form sheets telescope into the cavity created by the flange 24 of the trim ring. The support or vacuum box 25 fits over the cavity mold and is provided with an outwardly extending flange 26 which telescopes into the trim ring on top of the flanges 22B and 15B of the perforated sheets. The mold may be secured together by means of bolts passing through the trim ring 23 and the flanges of the perforated sheets and vacuum box, or alternatively, they may be adhesively secured together, or both belts and adhesive may be used. In either event, a bead of adhesive 27 is desirably placed in the crack around the edges of the vacuum box to provide a seal against passage of water. The vacuum box 25 is provided with a duct 28 by which it may be connected to a suitable vacuum source.

Both vacuum box 25 and trim ring 23 are made by vacuum forming over a simple wooden pattern in much the same manner as the perforated sheets. The mold form constructed of resinous material offers advantages not only in its manufacture, but savings in labor result from its use. It is more water resistant than molds formed in part from metal or wood with the results that no surface treatment is necessary. The vacuum box 25 may be readily formed to any desired shape and it may be dished out on its upper surface so that water may be more readily drained from it while the mold is in an inverted position.

Figure 7:
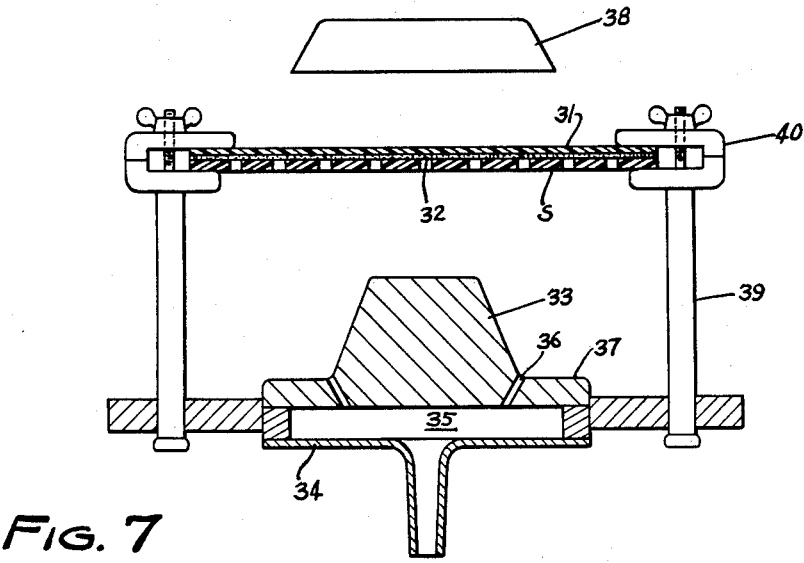
FIGURE 7 is a vertical section illustrating the method of forming a mold according to this invention, shown before forming.
Figure 8:
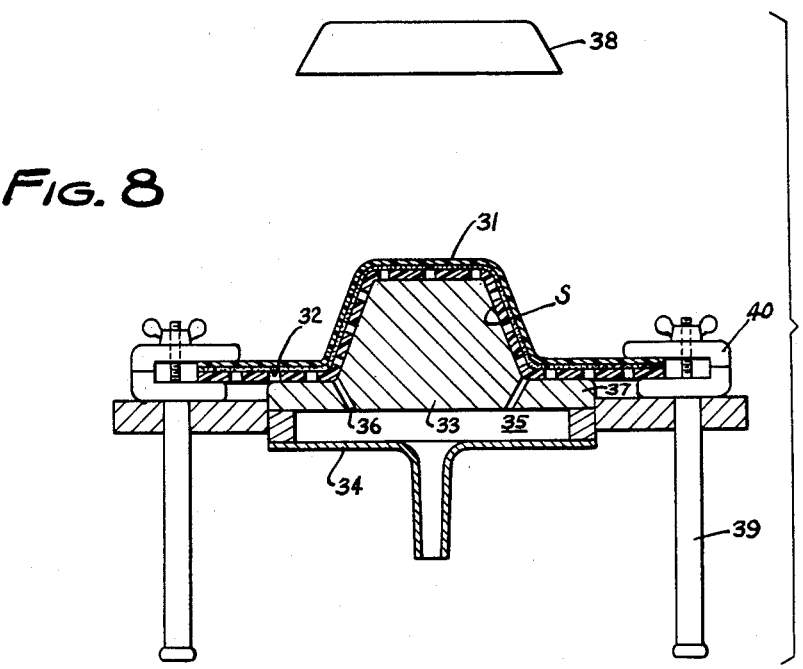
FIGURE 8 is a section similar to FIGURE 7 after the sheet has been formed.

Referring now to FIGURES 7 and 8, there is here illustrated the method for forming the perforated sheets 10, 10A and 10B, backing sheets 20, 20A and 20B, vacuum box 25 and trim ring 23 to the desired shapes. According to this method a thermoplastic sheet S, such as cellulose acetate, cellulose acetate butyrate, rigid vinyl, modified polstyrene, polyethylene—in general, any thermoplastic material which is commonly used in the sheet plastic forming arts—is perforated in a suitable mesh size. To this thermoplastic sheet is applied an imperforate film 31 of similar material or of material from the group outlined above, optionally covered with a thin layer of an adhesive film 32. This impervious structure can then be vacuum formed around or into a pattern 33 of the desired shape which is prepared beforehand and which may be made from any of the materials commonly used in the vacuum forming art.

The male pattern 33 made, for example, of wood, rests on a hollow box 34 inverted so as to contain vacuum chamber 35. In this instance the surface of the male pattern 38 conforms to the desired inner surface of the molded pulp article, due allowance being made for the thickness of the plastic forming sheet. Holes 36 on the order, for example, of about 0.030″ diameter, are drilled as shown through the pattern base 37 around the bottom of the pattern 33 and spaced, for example, about ½″ apart. The height of the box 34 is such that in the draping operation, the draping clamp preferably brings the plastic sheet about ⅛″ below the top surface of the pattern base 37.

A heater 38, which can be any of the various types conventionally used in the vacuum forming art, such as radiant panel or infra red heaters, is mounted on rollers which ride in a track so that the heater may be rolled over a draping frame 39 including a series of clamps 40 for holding the sheet S and film 31. After the heater 38 has raised the laminate to forming temperature, the frame 39 is lowered to the position indicated in FIGURE 8 and a vacuum is created in chamber 35. The suction draws the softened films against the pattern surface. The laminate then conforms to the surface of the male pattern 33 and is allowed to cool. The sealing films 31 and 32 may now be removed and the molding sheet is prepared for insertion in a mold.

Where a mold form is being constructed according to the embodiment of FIGURE 3 or 6, the molding surface and backing may be formed together and then the thermoplastic sheet S is a composite of a relatively thinner finely perforated thermoplastic sheet, such as sheet 10 or 10B, in combination with a relatively thicker and more coarsely perforated backing sheet of thermoplastic material, such as sheet 20 or 20B, with a thin separator film in between to prevent fusion of the perforated sheets. The thinner finely perforated sheet must always be placed between the heavy perforated sheet and the pattern. The fine sheet will draw down into the large holes of the heavy sheet if placed adjacent the side of the heavy sheet opposite the pattern. Alternatively, the sheets may be formed separately. When the piece being vacuum formed is, for example, to be used as a vacuum box, then the thermoplastic film S is not perforated and use of the imperforate film 31 is no longer necessary.

If it is desired to maintain exact dimensions on the inside of the thermoplastic sheet, one would drape form over a male plug. Conversely, to maintain dimensions on the outside of the thermoplastic sheet, one would vacuum form into a cavity. If dimensions of the finished article are not critical enough to necessitate allowing for the thickness of the plastic, it may be desirable to drape form even though the desired molding surface is to be the outside of the perforated sheet. Thus, for example, if one desired to attain maximum strength in the bottom of a box-shaped sheet, one would drape form because the smallest amount of stretch would occur in that section. Conversely, instances occur in which forming into a cavity would be the preferred method, regardless of which side of the sheet is to be the molding surface. These considerations and various other techniques will, of course, be immediately apparent to those skilled in the art of vacuum forming.

Although elementary vacuum forming techniques lend themselves well to our invention, we do not intend that the invention be limited to such. Any method of forming a perforated plastic sheet would enable one to produce the desired molding surface. Thus, one may use matched dies to mechanically form a preheated plastic sheet. Simple geometrical shapes may be produced by line bending techniques. To produce a molding surface for molded pulp packaging forms, the thermoplastic sheet may be drape formed around the article to be packaged; i.e., the article to be packaged would serve as the vacuum forming pattern. If this method is adopted, the pattern 33 may be dispensed with.

One important feature of our invention is that not only can a perforated molding surface be readily formed, but it may be produced as a separate, self-supporting unitary sheet. This allows replacing the expensive, machined castings used in the prior art as supporting mediums, with the easily constructed backing of our invention. Other advantages accruing from the use of the integral sheets of this invention are pointed out hereinafter.

It can thus be seen that this invention provides an excellent method for forming flat perforated resinous thermoplastic sheet material to any desired shape. Besides being used in molds, the formed perforated resinous sheets are useful in themselves for other purposes. They may be used, for example, as receptacles such as berry boxes or as sieves or strainers or even as components in furniture, such as lawn chairs or the like. Other uses for this formed perforated thermoplastic material will be apparent.

The thickness of the plastic sheets 10, 10A and 10B is determined on one hand by the degree to which the thermoplastic sheet must be stretched in order to form the desired molding surface. That is to say, if it is to be stretched to a great extent, it must be relatively thick in order that the portions of maximum stretch will be strong enough to withstand conditions encountered during use. On the other hand, maximum thickness is determined only to the extent that the material can be perforated in the desired mesh. We have found, for example, that cellulose acetate butyrate 0.040" thick, can be cleanly and inexpensively perforated in 0.020" diameter holes, up to about 1000 holes per square inch, and is made commercially available by companies who specialize in perforating sheet material. Machines designed specifically for perforating soft plastics, may be made to handle much thicker sheets, such as the embodiment illustrated in FIGURE 5.

The hole size of the finished molding surface should range from about .015" to about .050" in diameter. In order to meet this condition, one is limited as to how deep or extreme a structure can be vacuum formed without unduly distorting the perforations. To form molding surfaces in which a great deal of stretching must take place, one may vacuum form the desired molding surface in sections and subsequently cement or fasten these sections together to form a continuous sheet by simple means well known in the plastics art. These joining lines can be arranged so that they run parallel to the direction in which molded articles are to be removed, thereby allowing smooth, easy release of the molded article.

The supporting structure 11 of the embodiment illustrated in FIGURE 1 can be constructed from particles of any material which is inert to the environment in which the molding form is to be used, such as glass beads, metal shot, plastic beads and pellets, and gravel. These particles need not be perfectly regular nor uniform in shape. Nor is their size critical. They may be $\frac{1}{16}$" to $\frac{1}{2}$" or greater. For pulp molding purposes, they should not be so small that they tend to entrap minute pulp fibers which pass through the perforated sheet. On the other hand, they should be small enough so that the perforated plastic sheet is supported at enough points to prevent the surface of the sheet from being distorted during the vacuum phase of the molding cycle. To illustrate the wide variations permissible in size and shape: gravel particles containing about 20% crushed material, screened to range in sizes from $\frac{1}{8}$" to $\frac{5}{16}$", and cemented together to form a porous structure with walls about $\frac{1}{2}$" thick, produce a supporting member which does not tend to fill with pulp fibers and yet provides adequate support for a plastic molding surface.

The invention is further illustrated by the following example in which there is described the construction of a molding form suitable for use in producing molded pulp planters—box-shaped containers used in plant nurseries to hold growing plants and the dirt required for their growth. These containers have the smooth finish on the inside. Consequently, they are produced with male molding forms. This example, then, will describe the production of a male form. Application of our invention to construction of female type molding forms will be readily apparent to those skilled in the art of pulp molding, and/or the art of vacuum forming.

A sheet of cellulose acetate butyrate, 0.040" thick was perforated with holes 0.02 inch in diameter with about 700 holes per square inch. The holes in the sheet were temporarily sealed off so that vacuum could be applied during the forming operation by laying an impermeable and imperforate sheet of polystyrene over the perforated sheet. Polystyrene sheet having a thickness of 0.020" was used. The laminate so produced was clamped into the draping frame. The heater was then moved into position over the draping platform. When the laminate reached forming temperature, the draping frame was brought down, causing the softened laminate to drape or stretch around a suitably shaped wooden male pattern. As the draping frame reached the lowest position in its travel, a vacuum was applied through a vacuum line into the vacuum chamber and through the vacuum holes in the mold to the hot stretched laminate. In this manner the sheet was drawn snugly around the male pattern and after setting, was removed. In cases where the imperforate sheet, which is used for sealing the perforated sheet during the forming operation, is on the side of the molding sheet which normally rests against the backing, the formed molding sheet itself may be used as a pattern for the backing. The sealing sheet then acts as a release sheet. Otherwise, the formed sheet may be treated to readily release the backing, or a separate pattern may be used.

In this instance, into the drape formed perforated molding sheet was packed a mixture consisting of pieces of gravel ranging from about 1/8" to 5/16" in diameter uniformly admixed with 4% by weight of an adhesive which consisted of epoxy-polyamide in the ratio of 7 to 3. This adhesive set up spontaneously at room temperature to form a backing structure which is self-supporting. If a greater porosity in the backing member is desired, a solid wooden core, dimensioned to yield approximately 1/2" walls, may be sunk in the freshly mixed gravel-adhesive mixture. After about 6 hours, the aggregate was removed from the perforated molding sheet pattern and post-cured for about one hour at 300° F. The backing member and the perforated sheet was then recombined and mounted on a suitable vacuum box support as described above for use in a conventional pulp molding apparatus.

We were surprised to find that in spite of the fact that some of the holes of the molding sheet are distorted or enlarged in the process of forming, the sheet still functions well, is not subject to plugging, and can easily be kept clean. Furthermore, the molds may be prepared in a simple and straight-forward fashion and do not require the care of a skilled craftsman. The vacuum forming machine required for this operation does not need to be nearly as complex as a commercial vacuum forming machine. A simple combination of heat source, vacuum pump and an adjustable draping platform are sufficient for the needs of this invention. Because the number of new molding sheets required per day in the pulp molding industry is small in comparison to output of commercial vacuum forming machines, such elaborate vacuum forming machines are unnecessary and the molding sheets may be produced with a minimum of equipment and with the use of inexpensive manual controls.

Furthermore, since the thermoplastic perforated molding sheet does not have to be fixed to the backing, thin sheets tend to flex outward from the backing when positive air pressure is applied to release the molded article. This effect is particularly beneficial in female molding forms since the flexing action tends to help loosen the molded article from the molding surface. This in turn promotes good release, thus reducing subsequent warpage.

The mold herein described was found to have a number of advantages over prior art molds. Once the easily constructed wooden pattern is made, a large number of molds may be made rapidly and economically. This invention permits the manufacture of molds whose shapes are so complex as to be impossible to make by existing methods. The molds were found to be unaffected by acids or other corrosive agents used in the molding process. They were strong and durable enough to last indefinitely, and were not subject to becoming plugged with fibers.

This application is a division of our copending application Serial No. 713,762, filed February 6, 1958, for Molding Forms and Method of Making Them, now Patent No. 3,001,582.

It is apparent that many modifications and variations of this invention, as hereinbefore set forth, may be made without departing from the spirit and scope thereof. The specific embodiments described are given by way of example only, and the invention is limited only in terms of the appended claims.

We claim:

1. A method for producing shaped perforated resinous sheets comprising forming a temporary laminate by placing a continuous air impermeable thermoplastic and thermoformable resinous sheet over the surface of a flat perforated thermoplastic and thermoformable resinous sheet, interposing means between the sheets to prevent said sheets from fusing together under the influence of heat, heating the temporary laminate thus produced to a temperature at which it may be formed, stretching said temporary laminate over the surface of a pattern, said pattern having the shape desired in the finished sheets, withdrawing substantially all the air from between said temporary laminate and said pattern, allowing said temporary laminate to cool below the softening point, removing the temporary laminate from said pattern and separating said temporary laminate by removing said continuous sheet from said perforated sheet.

2. A method for producing molds of the type in which the article to be molded is deposited as a fibrous mass by means of a pressure differential acting across the surface of said mold, said method comprising forming a temporary laminate by placing a continuous imperforate thermoplastic and thermoformable resinous sheet over a perforated thermoplastic and thermoformable resinous sheet to seal the perforations in said second sheet, heating the temporary laminate thus produced to a temperature at which said temporary laminate may be formed, stretching said temporary laminate over the surface of a pattern, the surface of said pattern having the shape of the article to be molded, reducing the air pressure in the space between said temporary laminate and said pattern to draw said temporary laminate into close contact with said pattern, allowing said temporary laminate to harden while held in contact with said shape, separating said temporary laminate by removing said continuous sheet from said perforated sheet and mounting said perforated sheet on a support for use as a mold.

3. A method for producing molds of the type in which the aritcle to be molded is deposited as a fibrous mass by means of a pressure differential acting across the surface of said mold, said method comprising forming a temporary laminate by placing a continuous imperforate thermoplastic resinous sheet over the surface of a perforated resinous thermoplastic sheet, said perforated sheet having insufficient strength to withstand said pressure differential without deformation, heating the temporary laminate thus produced to a temperature at which said temporary laminate may be formed, stretching said temporary laminate over the surface of a pattern, said pattern having the shape of the article to be molded, withdrawing air from the space between said pattern and said temporary laminate, allowing said temporary laminate to cool while in contact with said pattern, removing said temporary laminate from said pattern, placing a porous flowable adhesive and particulate aggregate onto the surface of said perforated sheet opposite the molding surface, interposing means between the perforated sheet and aggregate to prevent adhesion of said aggregate to said perforated sheet, curing said adhesive to cause said aggregate to become rigid and mounting said perforated sheet and said aggregate on a vacuum box support.

4. A method according to claim 3 wherein the porous flowable adhesive and particulate aggregate material is a mixture of refractory bodies on the order of from 1/16 inch to 1/2 inch in diameter and a waterproof resinous adhesive.

5. A method of producing molds of the type in which the article to be molded is deposited as a fibrous mass by means of a pressure differential acting across the surface of said mold, said method comprising forming a temporary laminate by placing a continuous imperforate thermoplastic and thermoformable resinous sheet over the surface of a heavy perforated resinous thermoplastic and thermoformable sheet having relatively large holes spaced far apart, placing the heavy perforated sheet in turn over a relatively light weight perforated thermoplastic and thermoformable resinous sheet having relatively small holes spaced close together, interposing means between said sheets to prevent said perforated sheets from fusing together, the combined strength of said perforated sheets being sufficient to resist deformation by said pressure differential, heating the temporary laminate thus produced to a temperature at which it may be formed, drawing said temporary laminate over the surface of a pattern, said pattern having the shape of the article to be molded, withdrawing air from the space between said pattern and said temporary laminate, allowing said temporary laminate to cool while in contact with said pattern, removing said temporary laminate from said pattern, separating said temporary laminate by removing said continuous sheet from said laminate and mounting both of said perforated sheets on a vacuum box support.

6. A method for producing shaped perforated resinous sheets for use as pulp molding surfaces which comprises forming a temporary laminate by placing a continuous air impermeable thermoplastic and thermoformable resinous sheet over the surface of a flat perforated thermoplastic and thermoformable resinous sheet, said sheets being incompatible so as to prevent said sheet from fusing together under the influence of heat, heating the temporary laminate thus produced to a temperature at which it may be formed, stretching said heated temporary laminate over the surface of a pattern, said pattern having the shape desired in the finished shaped sheets, withdrawing substantially all of the air from between said temporary laminate and said pattern, allowing said temporary laminate to cool below its softening point, removing the temporary laminate from said pattern, separating said temporary laminate by removing said continuous sheet from said perforated sheet and mounting said perforated sheet on a support for use as a mold.

7. A method for producing molds of the type in which the article to be molded is deposited as a fibrous mass by means of a pressure differential acting across the surface of said mold, said method comprising forming a temporary laminate by placing a continuous imperforate thermoplastic resinous sheet over the surface of a perforated resinous thermoplastic sheet, said perforated sheet having insufficient strength when shaped to withstand said pressure differential without deformation heating the temporary laminate thus produced to a temperature at which said temporary laminate may be formed, stretching said temporary laminate over the surface of a pattern, said pattern having the shape of the article to be molded, withdrawing air from the space between said pattern and said temporary laminate, allowing said temporary laminate to cool while in contact with said pattern, removing said temporary laminate from said pattern, separating said laminate by removing said imperforate sheet from said perforated sheet, providing said perforated sheet on the surface opposite from the molding surface with a rigid air pervious backing composed of a porous particulate aggregate mass bonded together at points of contact with a waterproof adhesive, said rigid aggregate backing being shaped to the contour of the shaped perforated sheet opposite the molding surface, and mounting said perforated sheet and said aggregate backing on a vacuum box support.

References Cited in the file of this patent
UNITED STATES PATENTS

| | | |
|---|---|---|
| 1,737,874 | Busch | Dec. 3, 1929 |
| 1,984,018 | Hawley | Dec. 11, 1934 |
| 2,354,916 | Hurt | Aug. 1, 1944 |
| 2,471,932 | Chaplin | May 31, 1949 |
| 2,590,221 | Stevens | Mar. 25, 1952 |
| 2,783,175 | Smith et al. | Feb. 26, 1957 |
| 2,978,376 | Hulse | Apr. 4, 1961 |